Patented Apr. 15, 1947

2,419,057

UNITED STATES PATENT OFFICE 2,419,057

VINYL FURANE COPOLYMERIZATION PRODUCTS

Albert M. Clifford, Stow, Ohio, assignor to Wingfoot Corporation, Akron, Ohio, a corporation of Delaware No Drawing. Application May 20, 1943, Serial No. 487,809

3 Claims. (Cl. 260—84)

This invention relates to plastic masses having useful properties and, more particularly, to masses prepared by copolymerizing vinyl furane with an unsaturated compound of nonhydrocarbon character. The plastic masses have various useful characteristics, some of them resembling rubber in their properties.

The compound which is copolymerized with the vinyl furane may be any one of various nonhydrocarbon monomers having the general formula

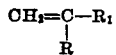

where R is hydrogen, alkyl, alkenyl or halogen, and $R_1$ is carboxy alkyl or halogen. Certain compounds included within the scope of the invention may be classified as vinyl carboxylic acid esters or esters of acrylic acids, vinyl cyanides or nitriles of acrylic acids, and vinyl halides.

Examples of carboxylic acid esters which may be copolymerized with the vinyl furane monomer are methyl acrylate, ethyl acrylate, and the corresponding propyl, isopropyl, butyl and isobutyl esters of acrylic acid and of substituted acrylic acids. The substituted acrylic acids whose esters may be used are illustrated by methacrylic acid, ethacrylic acid, propacrylic, etc., and some of the esters are methyl methacrylate, isobutyl methacrylate, isoamylmethacrylate, 2-ethyl hexyl methacrylate, isoamyl ethacrylate and isobutyl propacrylate.

The copolymerization may be accomplished by any of the methods customarily applied to the preparation of copolymers of this type, such as by heating the materials under anhydrous conditions with or without a solvent, or in aqueous emulsions in the presence of suitable polymerization catalysts, promoters, and modifying agents. The emulsion type of polymerization has been found to be very satisfactory, various emulsifying agents being employed therewith, such as sodium oleate, the higher sodium alkyl sulfates, sodium alkylated naphthalene sulfonates, etc. The monomers may be present in various proportions, but it has been found that satisfactory results are obtained when each of the monomers in a mixture of the vinyl furane and the unsaturated nonhydrocarbon monomer is present to the extent of at least 25 per cent of the total monomer. That is to say, the vinyl furane may be present in amount from 25 to 75 per cent of the whole, and the other constituent will, consequently, be present in the inverse proportion. Of course, these proportions may be departed from to some extent where polymerized masses with special properties are desired.

The following examples illustrate the preparation of the materials of the invention, but it will be understood that the same is not limited thereto. A temperature in the neighborhood of 50° C. may be employed for the polymerization and this temperature maintained until polymerization is complete. This temperature may be raised or lowered somewhat, effective polymerization taking place at room temperature and a temperature as high as 80° C. being employed in some instances. However, the temperature used will be selected with due regard to the type of product desired and the time of polymerization.

Example 1

An emulsion was made up of 8 parts of methyl methacrylate and 8 parts of vinyl furane together with .48 part of $CCl_4$ and 0.133 part of sodium perborate in 20 parts of 3 per cent aqueous sodium oleate. This was subjected to polymerization at 50° C. by rotating in a glass bomb for 284 hours. A quantitative yield of a resin-like polymer was obtained which milled satisfactorily at 130° F.

Example 2

This preparation was conducted under similar conditions to those prevailing in Example 1, but the methyl methacrylate was reduced to 25 per cent of the total monomer, and the vinyl furane was increased to 75 per cent. The product obtained was also a resin-like product and was obtained in quantitative yield.

Example 3

To 15 parts of aqueous 3 per cent sodium oleate were added 0.36 part of $CCl_4$ and 0.10 part of sodium perborate, and a mixture of monomers consisting of 4 parts of vinylidene chloride or acrylo dichloride and 8 parts of vinyl furane. The emulsion was agitated for 48 hours at a temperature of 50° C. and for an additional 182 hours at 75° C. A 93.3 per cent yield of a solid copolymer was obtained.

Example 4

To 15 parts of aqueous 3 per cent sodium oleate were added 0.36 part of carbon tetrachloride and 0.10 part of sodium perborate, and a mixture of monomers consisting of 8 parts of vinyl furane and 4 parts of 2-chlorobutadiene-1,3. This was polymerized for 40 hours at 50° C. A yield of about 99 per cent of a very tough and leathery product was obtained.

Example 5

To 20 parts of aqueous 3 per cent sodium oleate and 0.133 part sodium perborate a mixture of 12 parts of 2-chlorobutadiene-1,3, 2 parts of vinylidene chloride, and 2 parts of vinyl furane were added. The emulsion was agitated for 90 hours at 50° C. A yield of about 84 per cent of a fair rubber copolymer was obtained.

The polymerized masses obtained by following the procedure of the foregoing examples, as well as others prepared by copolymerization of vinyl furane with others of the esters and halogen compounds mentioned herein, may be used for various purposes; as, for example, in place of rubber, as a molding resin, and in varnishes or lacquers. The invention is not limited to the examples disclosed but is generally applicable to products obtainable by the copolymerization of vinyl furane and any of the unsaturated nonhydrocarbon compounds of the class defined. Accordingly, it is intended that the patent shall cover, by suitable expression in the appended claims, all features of patentable novelty residing in the invention.

This application is in part a continuation of my application Serial No. 202,270, filed April 15, 1938.

What I claim is:

1. A copolymer of 25 to 75 per cent of vinyl furane and 25 to 75 percent of a compound having the molecular structure

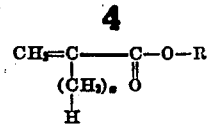

wherein R is an alkyl radical and $x$ is a whole number from 0 to 3 inclusive.

2. A copolymer of 25 to 75 percent of vinyl furane and 75 to 25 percent of an alkyl ester of methacrylic acid.

3. A copolymer of 25 to 75 percent of vinyl furane and from 75 to 25 percent of methyl methacrylate.

ALBERT M. CLIFFORD.

REFERENCES CITED

The following references are of record in the file of this patent:

UNITED STATES PATENTS

| Number | Name | Date |
| --- | --- | --- |
| 1,911,722 | Sorenson | May 30, 1933 |
| 2,117,321 | Hill | May 17, 1938 |

FOREIGN PATENTS

| Number | Country | Date |
| --- | --- | --- |
| 487,604 | British | June 22, 1938 |

OTHER REFERENCES

Hackh's Chemical Dictionary, 4th edition, 1944, pgs. 17, 169. (Copy Div. 50.)